Feb. 6, 1951     C. W. DEAN     2,540,245
FLEXIBLE BELT
Filed Aug. 26, 1947
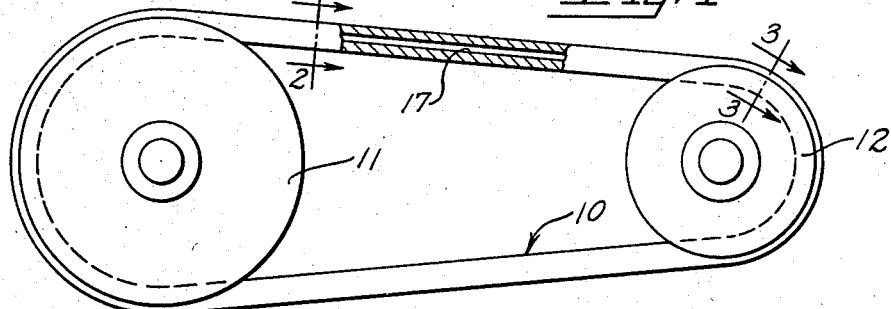
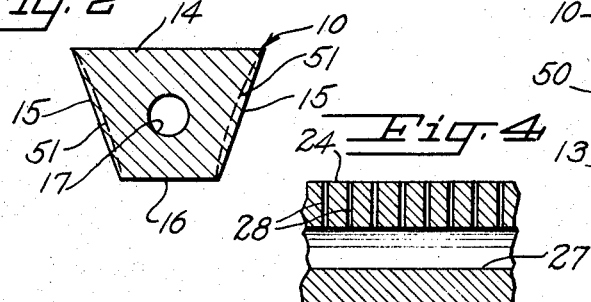
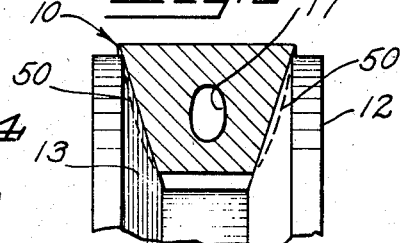
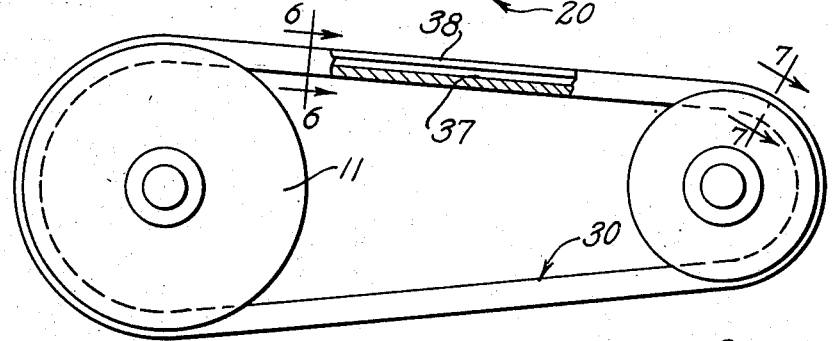
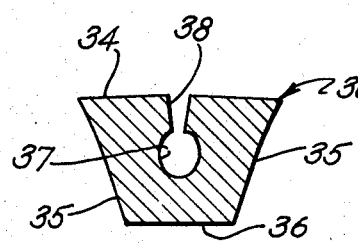
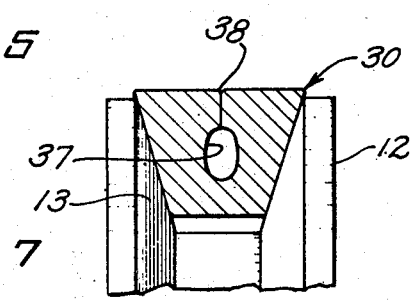
INVENTOR.
Charles W. Dean
BY
McMorrow, Berman & Davidson
Attorneys Patented Feb. 6, 1951

2,540,245

UNITED STATES PATENT OFFICE 2,540,245

FLEXIBLE BELT

Charles W. Dean, Denver, Colo.

Application August 26, 1947, Serial No. 770,673

8 Claims. (Cl. 74—234)

My invention relates to flexible belts for the transmission of power from a driving element to a driven element. More particularly, my invention relates to belts of the type known as V-belts which include inclined lateral faces adapted to be received in substantially V-shaped grooves of driving and driven sheaves.

Driving and driven sheaves are usually of different diameters, whereby the belt used therewith is subjected to complex stresses as it alternately is stretched around a small sheave, is straightened between sheaves, is stretched around a large sheave, and finally, is straightened between the sheaves. Thereafter, the foregoing cycle is rapidly repeated for relatively long periods of use. Such stresses set up internal friction in the usual solid belts, which friction results in an eventual break-down of the belt material and eventual failure of the belt itself. I have found that such breakdown commences with an initial break-down along the long axis of the belt in an area substantially centrally thereof.

With the foregoing in view, an object of my invention is to provide an improved belt of the class described.

A further object is to provide an improved belt of the class described which includes a continuous channel formed along the long axis of the belt.

A further object of the invention is the provision in a belt such as that last described of a plurality of vent holes extending radially inwardly from the outer periphery of said belt to said axial channel.

A further object is to provide a flexible belt having an axial channel therein formed along the entire long axis of the belt, and a circumferential slot extending radially inwardly from the outer periphery of the belt and opening into said axial channel, said slot being adapted to be closed during at least a part of each cycle of rotation of the belt.

Other objects and advantages reside in the particular structure of the invention, combination and arrangement of the several parts thereof, and/or in the particular method or mode of operation, all of which will be readily apparent to those skilled in the art upon reference to the drawings, in connection with the following specification, wherein the invention is shown, described and claimed.

In the drawings:

Figure 1 is an elevation of one form of the belt applied to a pair of sheaves, a portion of the belt being broken away and shown in longitudinal vertical section;

Figure 2 is an enlarged transverse vertical section taken substantially on the plane of the line 2—2 of Figure 1;

Figure 3 is an enlarged transverse vertical section taken substantially on the plane of the line 3—3 of Figure 1;

Figure 4 is a fragmentary longitudinal vertical section showing a modification of the belt of Figure 1;

Figure 5 is a view like Figure 1, but showing the second modification of the invention;

Figure 6 is an enlarged transverse vertical section taken substantially on the plane of the line 6—6 of Figure 5;

Figure 7 is an enlarged transverse vertical section taken substantially on the plane of the line 7—7 of Figure 5.

Referring specifically to Figures 1, 2, and 3 of the drawings, 10 designates generally a belt according to one form of the invention, which belt is substantially annular in elevation, and which is shown extending around a sheave 11 of substantially large diameter and also around a sheave 12 of substantially lesser diameter. Each of the sheaves 11 and 12 is provided with a substantially V-shaped groove 13 on the periphery thereof to receive the belt 10. The belt 10 comprises an annular member made of any suitable belt material and which is substantially polygonal in cross-section to provide an outer periphery 14, inwardly and downwardly inclined sides 15, and a relatively narrow inner periphery 16. The belt 10 is formed to provide a continuous channel 17 which extends longitudinally and entirely around the annulus of the belt along the longitudinal axis thereof. The channel 17 is normally circular in cross-section, as clearly shown in Figure 2.

In the modification of Figure 4, the belt 20 is of the same general shape as that of Figures 1, 2, and 3, and is provided with an outer periphery 24 and an interior channel 27 corresponding to the channel 17 of the preferred form. A plurality of vent holes 28 extend from the outer periphery 24 into the channel 27 and are arranged in a row around the outer periphery of the belt.

In the form of the invention disclosed by Figures 5, 6, and 7, the belt is generally designated by the reference character 30 and has the same general cross-section of the other forms described hereinabove, which portions include the outer periphery 34, which is substantially flat, the inwardly and downwardly inclined sides 35, and the relatively flat inner periphery 36. As in the other forms of the invention, the belt 30 is provided with a longitudinally-extending, axially-disposed internal channel 37 which extends entirely around the belt on the long axis thereof. The outer periphery 34 of the belt 30 is formed to provide a continuous slot 38 which extends entirely around the outer periphery of said belt and opens into the internal channel 37.

In this last-mentioned form of the invention, it is noted that the slot 38 is divergent in form, whereby to impart a like divergence to the sides 35 above the channel 37, Figure 6. However, as is clearly disclosed in Figure 7, when the belt 30 passes around a sheave, the pressure of the inclined gripping surfaces 13 of the sheave force the side walls 35 inwardly, whereby to close the slot 38. However, the slot 38 is adapted to spring open again while the belt is between the sheaves.

In all forms of the invention, and as is clearly shown in Figures 3 and 7, while the belts are passing around the sheaves, channels 17, 27, and 37 are pressed inwardly until they assume an oval shape in cross-section. It should be noted in connection with Figure 4 that while this form of the invention is being passed around the sheaves, the rapidly alternating change in shape of the channel causes the vent holes 28 to be distorted and partially closed in the same manner in which the slot 38 is closed in the form of Figures 5, 6, and 7, and generate a pumping action to circulate air into and out of the channel.

While the dimensions of my belt will vary according to the size of the belt and the use to which it is adapted to be put, it is to be understood that the thickness of the wall portions of the belt radially outwardly of the interior channel in all directions is of sufficient thickness to withstand the normal tensile stresses of a belt of this type without increasing the over-all dimensions of the belt to any appreciable extent or without the necessity of additional longitudinally-extending reinforcing members.

In the use of a belt of this type without the central channel as provided by my invention, a normal effect which arises by the passage of the belt around a sheave is to cause the side walls to tend to bulge outwardly against the sheave wall, as is indicated by the broken lines 50 in Figure 3. Where sheaves of unequal diameter are used, this effect is greatest as the belt passes around the smaller sheave, whereby to eventually cause concavity of the side walls of the belt, as is indicated in broken lines 51 in Figure 2. When this occurs, it is difficult to obtain full traction as the belt passes around the larger sheave. This lost traction around the larger sheave sacrifices much of the wedge effect of the principle of the V-belt, and there is a consequent loss of traction and efficiency.

On the other hand, in a belt such as that illustrated hereinbefore, the tendency to bulge the sides outwardly is overcome by the compressibility of the belt as a whole, which is achieved by the internal channel 17 which, as is shown in Figure 3, assumes an oval shape in cross-section as these stresses are applied to the side walls. Thus, the channel of my invention eliminates the internal friction which normally would arise along the long axis of the belt centrally thereof, and, consequently, the stresses initiating the majority of belt breakdowns are eliminated in my construction.

By providing vents, such as those 28 of Figure 4, or the slot 38 of Figures 5, 6, and 7, I provide means for dissipating any heat which is generated centrally of the belt along the long axis thereof. In the form of Figure 4, the cross-section of the belt may be the same as that of Figures 1, 2, and 3. However, in the form of Figures 5, 6, and as clearly shown in Figure 6, the outer periphery 34 is slightly wider than that of the outer periphery 14 of the first-described form, and the side walls 35 diverge slightly more above the channel 37 to an extent that they will be straight when the sheave forces the slot 38 closed, as it passes around the sheaves. While the belt of this form of the invention is between the sheaves, the slot 38 springs open again, as shown in Figure 6.

While I have shown and described what is now thought to be the preferred embodiments of my invention, it is to be understood that the same is susceptible of other forms and expressions. Consequently, I do not limit myself to the precise forms shown and described hereinabove, except as hereinafter claimed.

I claim:

1. A flexible belt comprising an annulus of flexible material, an internal continuous annular channel extending longitudinally of said belt axially thereof, said channel being of relatively small cross-section to provide relatively thick wall portions substantially entirely surrounding said channel, said belt having inner and outer peripheries and opposed side surfaces connecting said peripheries, and said outer periphery being formed to provide a continuous slot extending longitudinally around said periphery, said slot extending radially inwardly from said outer periphery and opening into said channel.

2. A flexible belt comprising an annulus of flexible material, an internal continuous annular channel extending longitudinally of said belt axially thereof, said channel being of relatively small cross-section to provide relatively thick wall portions substantially entirely surrounding said channel, said belt having inner and outer peripheries and opposed side surfaces connecting said peripheries, said outer periphery being formed to provide a continuous slot extending longitudinally around said periphery, said slot extending radially inwardly from said outer periphery and opening into said channel, and said slot and side walls diverging above said channel in substantially parallel planes.

3. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel.

4. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel, said passage means comprising a slot.

5. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel, said passage means consisting of a continuous slot.

6. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel, said passage means comprising a plurality of spaced radial bores spaced circumferentially around said belt and extending from said outer periphery of said annulus to said channel.

7. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel, said passage means comprising a plurality of spaced radial bores spaced circumferentially around said belt and extending from said outer periphery of said annulus to said channel, said channel being of substantially circular cross section.

8. A flexible belt comprising an annulus formed with an internal continuous annular channel extending therearound, said annulus having an outer periphery, an inner periphery, and sides from which said channel is substantially spaced, and vent means extending entirely around said annulus and comprising passage means extending inwardly from said outer periphery to said channel and providing communication between the air outside said belt and said channel, said channel being of substantially circular cross section.

CHARLES W. DEAN.

REFERENCES CITED

The following references are of record in the file of this patent:

UNITED STATES PATENTS

| Number | Name | Date |
| --- | --- | --- |
| 1,064,097 | Selzer | June 10, 1913 |
| 1,079,515 | Rondeau | Nov. 25, 1913 |
| 2,423,579 | Buren | July 8, 1947 |

FOREIGN PATENTS

| Number | Country | Date |
| --- | --- | --- |
| 532,386 | France | 1921 |
| 212,964 | Great Britain | 1923 |